United States Patent [19]
Sommer et al.

[11] Patent Number: 5,993,526
[45] Date of Patent: Nov. 30, 1999

[54] PROCESS FOR THE PRODUCTION OF A PEARL SHINE PIGMENT PREPARATION

[75] Inventors: Günter Sommer, Lauf; Günter Kaupp, Neuhaus, both of Germany

[73] Assignee: Eckart-Werke Standard Bronzepulver-Werke Carl Eckart GmbH & Co., Furth, Germany

[21] Appl. No.: 08/841,465

[22] Filed: Apr. 22, 1997

[30] Foreign Application Priority Data

Apr. 24, 1996 [DE] Germany .............................. 196 16 287

[51] Int. Cl.⁶ ........................................ C09D 11/02
[52] U.S. Cl. ........................ 106/31.65; 106/31.69; 106/31.9; 106/417; 106/418
[58] Field of Search .................... 428/402, 403, 428/407; 106/417, 418, 31.65, 31.69, 31.9

[56] References Cited

U.S. PATENT DOCUMENTS

| | | | |
|---|---|---|---|
| 3,544,500 | 12/1970 | Osmond et al. | |
| 3,647,492 | 3/1972 | Chapman et al. | |
| 3,708,318 | 1/1973 | Reinhart et al. | 106/404 |
| 3,755,244 | 8/1973 | Hart . | |
| 4,116,711 | 9/1978 | Avera . | |
| 4,127,422 | 11/1978 | Guzi, Jr. et al. | |
| 5,228,912 | 7/1993 | Herget et al. | 106/505 |
| 5,455,288 | 10/1995 | Needham | 523/205 |
| 5,618,342 | 4/1997 | Herget et al. | 106/416 |
| 5,733,365 | 3/1998 | Halko et al. | 106/437 |

FOREIGN PATENT DOCUMENTS

WO 93/11199   6/1993   Germany .

*Primary Examiner*—Helene Klemanski
*Attorney, Agent, or Firm*—James A. Lucas; Driggs, Lucas, Brubaker & Hogg Co., L.P.A.

[57] ABSTRACT

A pearl shine pigment preparation as a pre-product for a printing ink in which pearl shine pigment is made into a paste with a binding agent and optionally with a solvent and/or additives and the paste is put into a compact particle form. For that purpose the paste is compressed to form compact particles by tabletting, briquetting, pelleting or extruding. In that compacted form the pearl shine pigment preparation can be used for the production of printing inks, in particular intaglio printing inks.

22 Claims, No Drawings

PROCESS FOR THE PRODUCTION OF A PEARL SHINE PIGMENT PREPARATION

BACKGROUND OF THE INVENTION

The invention concerns a process for the production of a pearl shine pigment preparation as a pre-product for a printing ink containing pearl shine pigment.

Pearl shine pigment is usually on the market in dust or powder form. For processing in the printing ink, the pearl shine pigment is mixed with a binding agent solution and possibly additives which are conventional in printing procedures and the mixture is adjusted to the viscosity required for application by a printing process. To achieve the soft shine effect which is typical of pearl shine pigment in the printing ink the distribution and orientation of the pearl shine pigment particles in the binding agent need to be as uniform as possible.

In principle high shearing forces are to be avoided in any procedure for processing pearl shine pigments. Therefore the pearl shine pigment must be subjected to pre-treatment with solvent over several hours (so-called "sumping") prior to the actual dispersing procedure for production of the printing ink. That operation is time-consuming and therefore also expensive. In spite of the pretreatment by "sumping" and agitation the desired uniform dispersion cannot always be achieved and as a result the printing may also not be fully satisfactory.

Objects and Advantages

The object of the invention is therefore that of providing pearl shine pigment for printing inks in such a fashion that thereby the actual production of the printing ink is considerably facilitated and simplified and in particular the desired print quality, that is to say an excellent pearl shine effect, is achieved.

That object is attained in that the pearl shine pigment is prepared by the process recited in the claims to afford a particulate pre-product of the printing ink.

It has surprisingly been found that due to pre-wetting of the pearl shine pigment particles with that binding agent which is required or desired for the printing ink to be processed, the pigment particles are dispersed considerably more quickly and more uniformly in the binding agent solution which is used in the actual manufacture of the printing ink. Besides a time saving and increase in flexibility which is related thereto from the point of view of the user, this results in a marked improvement in the desired pearl shine effect in printing. That is surprising for the reason that, in consideration of the presence of the pearl shine pigment preparation in coarse particle form, a more intensive mixing operation is to be expected in order to achieve a sufficiently uniform dispersion. The crucial consideration in this respect seems to be the pre-wetting of the pigment particles with the corresponding binding agent, which is surprisingly maintained in spite of the paste being converted into a compact particle form. Evidently the effect of pressing or compacting the paste, which occurs in that situation, even results in particularly intimate pre-wetting of the pigment particles with the binding agent.

DETAILED DESCRIPTION OF THE INVENTION

The binding agents which can be considered for pre-wetting of the pearl shine pigment are all binding agents or binding agent mixtures which are usually considered for printing inks insofar as they are the same as or at least compatible with the respective printing ink binding agent system used. It is thus possible to employ binding agents based on cellulose, polyacrylate-polymethacrylate, alkyd, polyester, polypherol, urea, melamine, polyterpene, polyvinyl, polyvinylchloride and polyvinylpyrrolidone resins, polystyrenes, polyolefines, coumarone-indene, hydrocarbon, ketone, aldehyde and aromatic formaldehyde resins, carbamic acid, sulfonamide, and epoxy resins, polyurethanes and/or natural oils or derivatives of said substances. Particularly good re-dispersibility of the pearl shine pigment preparation according to the invention has been found to occur if cellulose or cellulose compounds are used as the binding agent. Cellulose or cellulose compounds evidently result in intensive pre-wetting of the pearl shine pigment particles and thus yield a printing ink pre-product which in turn can be quickly dispersed in a binding agent solution which is compatible therewith, in manufacture of the printing ink. This applies in particular in regard to pre-wetting with cellulose compounds as these obviously promote on the one hand the binding effect in respect of the particles of the pearl shine pigment and on the other hand the formation of the paste from which the preparation is produced in particle form by compacting.

The group of cellulose or cellulose compounds which are particularly suitable for the process according to the invention includes cellulose nitrate, alkyl cellulose, hydroxy cellulose, hydroxyalkyl cellulose and cellulose acetobutyrate.

The amount of binding agent used is not critical and is in the range of between 0.5 and 45% by weight, preferably between 2 and 15% by weight.

What is of significance however is the viscosity of the mixture as is adjusted by the addition of solvent for the binding agent, prior to shaping of the preparation particles by compacting to give the particle form, as, with an excessively high solvent content in the mixture, the pearl shine pigments have a strong tendency to separation from the binding agent solution while if the viscosity is too high the wetting effect is incomplete and the operation of shaping particles is made considerably more difficult.

Conversion of the pearl shine pigment paste into a compact particle form can be effected by the use of different processes which are familiar to the man skilled in the art, namely by tabletting, briguetting, pelleting, granulating or spray granulating. In all those cases a pressure is applied to the paste in a more or less viscous condition, which pressure promote the above-discussed prewetting of the pigment particles with the binding agent. Accordingly the particles are in the form of tablets, briquettes, pellets, granular material, balls, small sausage-like objects or another corresponding coarse-grain form. Pressing or extruding is particularly preferred as the compacting procedure adopted.

When the mixture or paste of pearl shine pigment and binding agent solution is pressed through an apertured plate, being an operation which is effected either in a batch-wise manner by means of pistons or continuously by means of an extruder, the result obtained is particles in the form of small sausage-like objects. Suitable adjustment of the viscosity of the mixture can provide that the length of the particles is automatically regulated by the particles breaking, or dropping off or tearing off on issuing from the apertured plate. Dividing up the elongate portions of paste wihich issue from the apertured plate to constitute particles can however also be effected in known manner by a mechanical action, for example by rotating cutting blades. The pelleting or granulating operation is effected in known manner on pelleting plates or in granulating containers and generally results in spherical particles of preparation. The particles which are initially produced by the operation of pressing through an apertured plate can then be additionally post-shaped by pelleting or granulation. Tabletting or briquetting is effected by pressing the paste in suitable moulds.

The drying operation which is then effected after the step of shaping the preparation particles causes the solvent contained in the binding agent to be substantially removed so that the particles of preparation on the one hand present adequate mechanical strength to retain their shape in handling and transportation, while on the other hand upon contact with a binding agent solution they quickly break up and thereby disperse just with the slightest mechanical effect (stirring).

If the binding agent is still sufficiently viscous after removal of the solvent to permit compacting of the paste to afford the particle form, it is possible to envisage removing the solvent from the paste prior to the compacting operation by drying. Optionally the viscosity for the compacting operation can be reduced by an increase in temperature of the paste.

The nature of the operation of drying the paste or particles produced by the compacting procedure and the effect of driving off the solvent which is effected thereby, is substantially dependent on the nature of the solvent used. As most of the solvents which are envisaged here, particularly in conjunction with cellulose as a binding agent are volatile below the softening point of the binding agent, the drying operation can be conducted at reduced pressure and/or at elevated temperature. In that respect, in the case of drying the particles, it can be envisaged selecting a temperature near to the softening point of the binding agent in order thereby to provide for sintering, which occurs at least in an edge layer of the particles, in respect of the pearl shine pigment particles which are coated or pre-wetted with the binding agent. That improves the stability in respect of shape of the preparation particles for handling and the duration of transportation. The size of the particles preferably is between 0.2 and 80 mm.

The present invention is also concerned with pearl shine pigment based on mica, such as for example muscovite, biotite or synthetic mica, with a $TiO_2$- and/or $Fe_2O_3$-coating. Optionally further metal oxide layers of the series B, Al, Si, Cr, Sn, Zn, Zr or Ce may also additionally be included. It is likewise possible to use pearl shine pigment such as mica, preferably muscovite mica with a coating of titanium suboxides, titanium oxynitrides and titanium nitrides or mixtures thereof.

In addition to the metal oxide coating there may also be a covering with colouring pigments or dyes on the pearl shine pigment. It is also possible to achieve a coloristic configuration of that kind by mixing the pearl shine pigments with colouring substances in the range of between 0.1 and 30% by weight with respect to the pearl shine pigment in the paste-forming procedure.

In accordance with the process according to the invention it is also possible to produce mixtures of pearl shine pigments and metal pigments in the desired preparation as it has been found that a certain proportion of metal pigments does not adversely affect the influence of pre-wetting with the binding agent. The proportion of metal pigments should be at least 0.5% but not more than 20% by weight of the pearl shine pigment proportion. Suitable metal pigments are all metals which are currently used in the effect-pigment sector such as aluminium, copper, zinc, tin and alloys thereof. Aluminium and gold-bronze pigments are preferred for that purpose.

We claim:
1. A pearl shine pigment preparation in the form of a granular material for use as a pre-product in a printing ink system, the preparation consisting essentially of pigment particles coated with a binding agent present in an amount sufficient to render the granular material capable of flow, the pigment particles and binding agent being compatible with the printing ink system.

2. A pearl shine pigment preparation as set forth in claim 1 wherein the granular material has a particle size of between 0.2 and 80 mm.

3. The pearl shine pigment preparation according to claim 2 wherein the pigment comprises mica.

4. The pearl shine pigment preparation according to claim 3 further including a coating on the pigment, the coating selected from the group consisting of $TiO_2$, $Fe_2O_3$, metal oxides of B, Al, Si, Cr, Sn, Zn, Zr, Ce, titanium suboxides, titanium oxynitrides, titanium nitrides and metal pigments of aluminum, copper, zinc, tin and their alloys.

5. A printing ink containing a pearl shine preparation as claimed in claim 1.

6. The printing ink according to claim 5 wherein the ink is an intaglio ink.

7. The printing ink according to claim 5 wherein the particle size of the granular material is between 0.2 and 80 mm.

8. A process for the preparation of a pearl shine pigment as a pre-product for a printing ink system, the process comprising the steps of
   a) preparing a paste of the pearl shine pigment and at least one binding agent compatible with said printing ink system by dissolving the binding agent in a solvent to form a binding agent solution and dispersinig the pigment in the binding agent solution thereby avoiding high shearing forces on the pearl shine pigment while dispersing, the binding agent used in an amount of between 0.5 and 45% by weight with respect to the pearl shine pigment,
   b) compacting the paste into compact particles, and
   c) removing the solvent from the paste, either prior to, or following the step of compacting the paste.

9. The process according to claim 8 wherein the pigment is a mixture of between 80% and 99.5% by weight of pearl shine pigment and between 20 and 0.5% of metal effect pigment selected from the group based on Al, Cu, Zn, Sn, and alloys thereof.

10. A process according to in claim 8 wherein the binding agent is a cellulose compound selected from the group consisting of cellulose nitrate, alkyl cellulose, hydroxy cellulose, hydroxyalkyl cellulose and cellulose acetobutyrate.

11. A process according to in claim 8 wherein the paste is formed into coarse-grain particles having a particle size in the range of between 0.2 and 80 mm.

12. A process according to claim 8 wherein the paste is shaped by a process selected from the group consisting of tabletting, briquetting, pelleting, granulating, spray-granulating, moulding, extruding, and pressing followed by post shaping.

13. A process according to claim 8 wherein the binding agent is used in an amount of between 0.5 and 45% by weight with respect to the pearl shine pigment.

14. A process according to claim 13 wherein the binding agent is used in an amount of between 2 and 15% by weight with respect to the pearl shine pigment.

15. A process according to in claim 8 wherein the paste is freed of the solvent by drying under process conditions selected from the group consisting of reduced pressure, elevated temperature and a combination thereof.

16. A process according to claim 15 wherein the particles are at least partially sintered during drying.

17. The process according to claim 8 wherein the pearl shine pigment is mica.

18. The process according to claim 17 wherein the mica is coated with a coating selected from the group consisting of $TiO_2$, $Fe_2O_3$, and mixtures thereof.

19. The process as set forth in claim 18 wherein the coating is further coated with a metal oxide layer selected from the oxides of B, Al, Cr, Si, Sn, Zn, Zr, and Ce.

20. The process according to claim 17 wherein the mica is coated with a coating of at least one titanium compound selected from the group consisting of suboxides, oxynitrides and nitrides of titanium.

21. The process according to claim 19 further including the step of coating the metal oxide coating with a covering selected from the group consisting of coloring pigments and dyes.

22. A process according to claim 8 wherein the pearl shine pigment preparation contains between 0.1 and 30% by weight with respect to the pearl shine pigment of a colorant selected from the group consisting of colour pigments and colour dyes.

\* \* \* \* \*